United States Patent

Kafrissen et al.

Patent Number: 5,848,668
Date of Patent: Dec. 15, 1998

[54] PORTABLE LIFTING SYSTEM FOR EASY MOVEMENT OF MODERATELY HEAVY ITEMS

[75] Inventors: Edward Kafrissen, Lynbrook; Robert F. Ulrich, Huntington, both of N.Y.

[73] Assignee: EZ Life Products, Inc., Northport, N.Y.

[21] Appl. No.: 885,927

[22] Filed: Jun. 30, 1997

Related U.S. Application Data

[63] Continuation of Ser. No. 554,646, Nov. 8, 1995, abandoned.

[51] Int. Cl.$^6$ ........................................................ B66B 3/00
[52] U.S. Cl. ........................ 187/231; 187/233; 187/237; 187/243; 254/2 R; 254/7 R; 254/7 C; 254/2 C
[58] Field of Search ................................... 187/222, 224, 187/231, 232, 233, 237, 238, 242, 243, 244, 401; 254/7 R, 2 R, 7 C, 2 C

[56] References Cited

U.S. PATENT DOCUMENTS

| | | | |
|---|---|---|---|
| 783,699 | 2/1905 | Laffin | 254/7 R |
| 878,002 | 2/1908 | Imboden et al. | 254/7 R |
| 937,256 | 10/1909 | Minnich | 187/232 X |
| 1,101,598 | 6/1914 | Weinke | 187/233 X |
| 2,419,813 | 4/1947 | Berchtold | 187/237 X |
| 2,514,563 | 7/1950 | Todd | 187/233 |
| 2,774,498 | 12/1956 | Cordes et al. | 187/237 X |
| 2,792,079 | 5/1957 | Gibson | 187/243 X |
| 2,962,730 | 12/1960 | Carnes et al. | 254/7 R |
| 3,052,323 | 9/1962 | Hopfeld | 182/243 X |
| 3,085,656 | 4/1963 | Hopfeld | 187/231 |
| 3,232,380 | 2/1966 | Hansen | 187/237 |
| 3,412,980 | 11/1968 | Pikoske | 254/7 R |
| 3,957,137 | 5/1976 | Vermette | 187/232 |
| 4,061,237 | 12/1977 | Austin et al. | 187/231 X |
| 4,427,094 | 1/1984 | Winkelplech | 187/243 X |
| 4,987,976 | 1/1991 | Daugherty . | |
| 5,137,317 | 8/1992 | Bieniek | 294/58 |
| 5,184,366 | 2/1993 | Rawdon et al. | 14/71.5 |
| 5,205,571 | 4/1993 | Geier et al. | 280/47.35 |
| 5,375,681 | 12/1994 | Eickman | 187/237 |

OTHER PUBLICATIONS

Scania catalog—1 page—World's First Electric Lift Truck
Global Equipment Co Catalog 4 pages.

*Primary Examiner*—Boris Milef
*Attorney, Agent, or Firm*—Martin S. Glass, Esq.

[57] ABSTRACT

A method, device and system are provided that is a portable lifting system for easy movement of moderately heavy items, including a base member, a vertical support member connected to the base member and a load member slideably connected along the vertical support member. The system is typically small in size, allowing for ease of loading, lifting, transporting and unloading of moderately heavy objects of 25 to 100 pounds. The system is typically used in enclosed areas such as an office, home, workshop, garage or basement. The actual load member varies depending upon the type of load being lifted. A common type connector is used allowing interchangeability between the various load members. The system can further include a mechanical advantage member including a screw or a motor to control load member height. The mechanical advantage member may be controlled manually, or electronically.

9 Claims, 11 Drawing Sheets

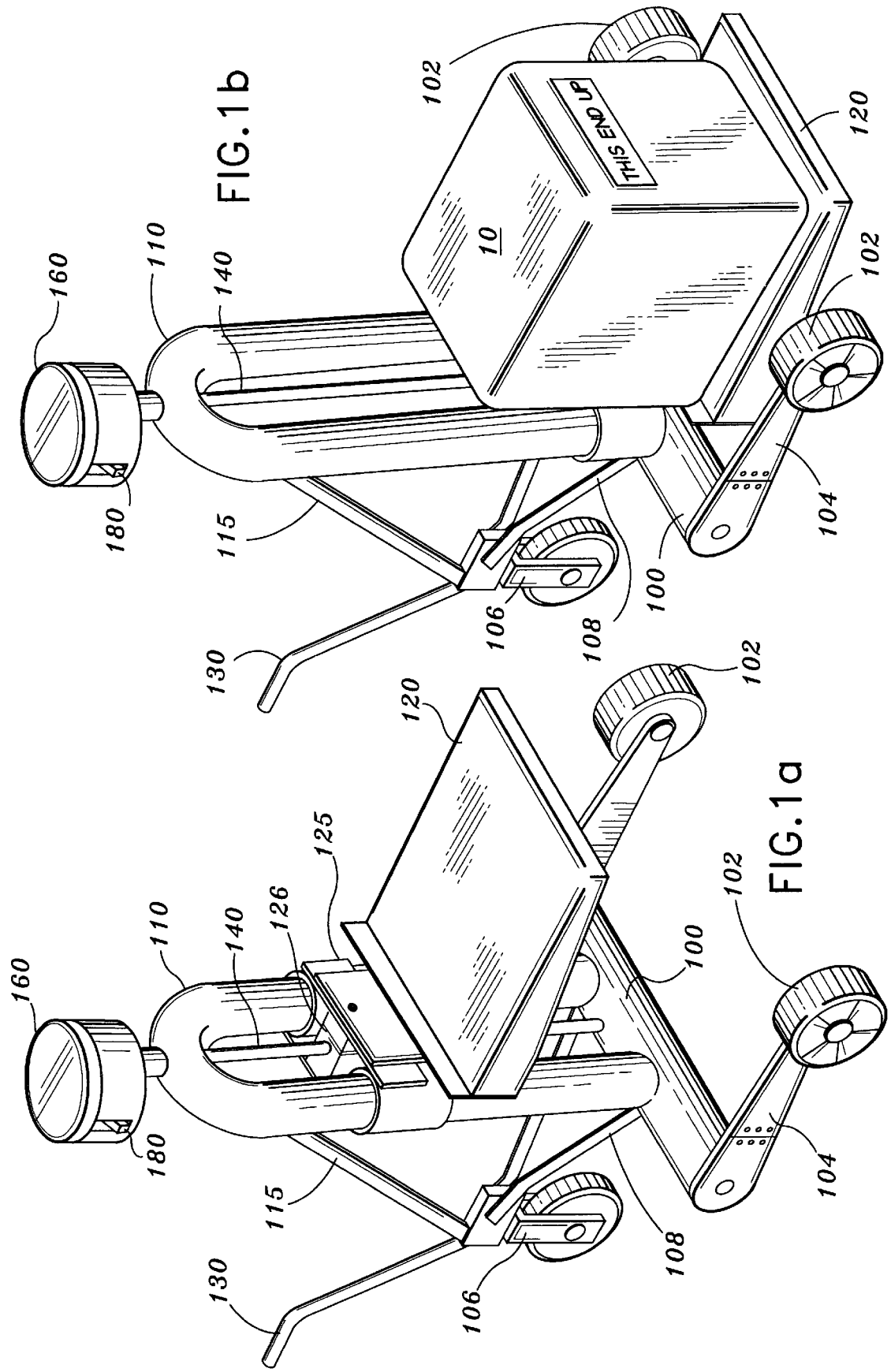

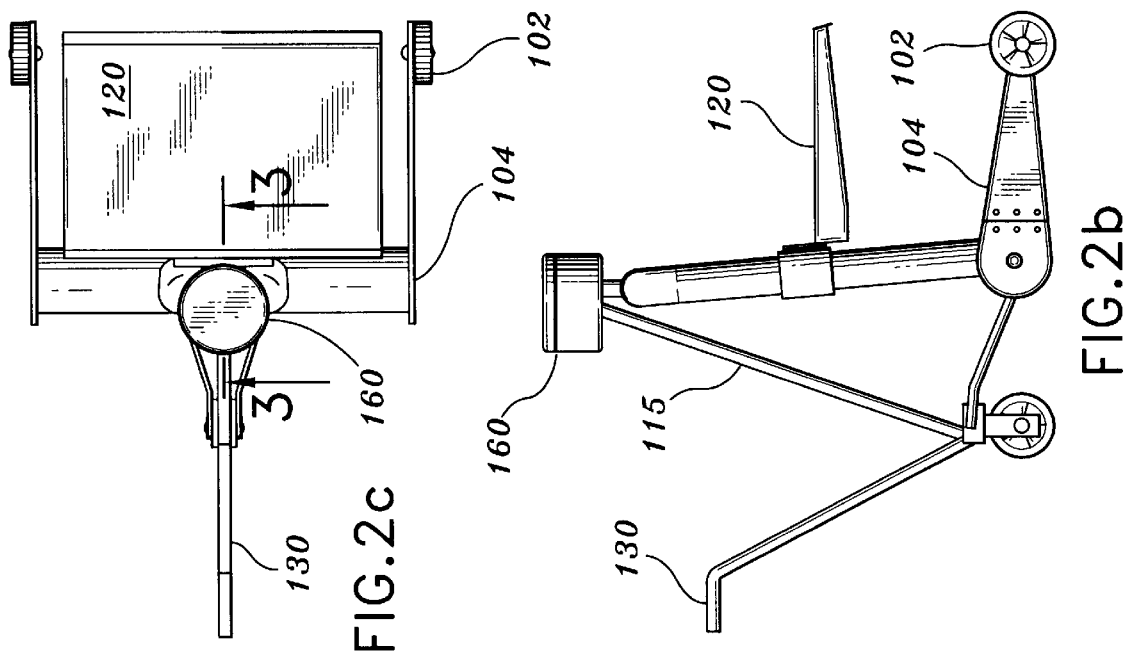
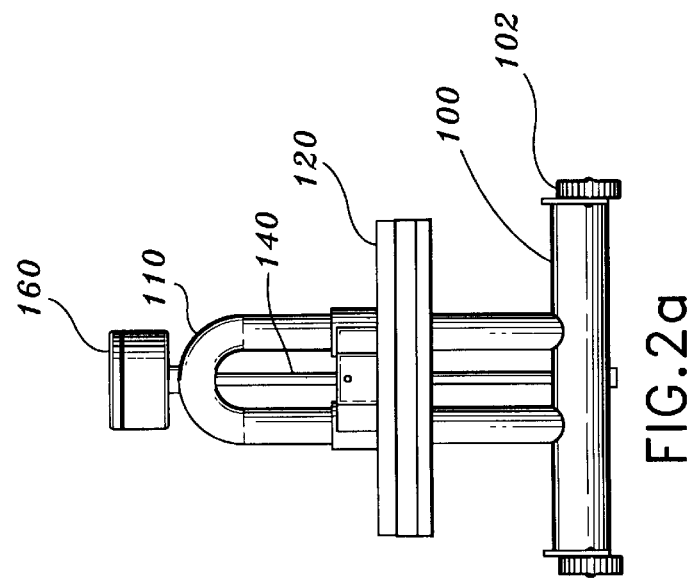

PORTABLE LIFTING SYSTEM FOR EASY MOVEMENT OF MODERATELY HEAVY ITEMS

This is a continuation of application Ser. No. 08/554,646 filed on Nov. 8, 1995, now abandoned.

BACKGROUND

This invention relates to methods, devices and system for easily loading, lifting, transporting, and unloading of moderate weight (25–100 pounds) objects in the office, home, workshop, garage, basement, drive way or the like places. Plurality of embodiments are disclosed to suit varying needs, loads and circumstances.

THE PROBLEM

Frequently there is need to rearrange furniture, office equipment and like moderate weight objects of 25 to 100 pounds. Similarly there is need to move objects such as gravel, bird seed, groceries and heavy packages around the house. Most people cannot afford or cannot wait for professional movers to arrive every time a need arises for relocating such an object. Furthermore many DIY (Do It Yourself) users or movers do not know how to lift objects of even moderate weight safely without hurting or injuring their backs.

Following are some of the typical uses of Easy Lift system of this invention:

a) Relocating an office equipment such as a printer, copying machine or a box of copy paper in the office.
b) Installing a new office equipment.
c) Discarding a heavy piece of equipment.
d) Moving a heavy object from a motor vehicle to a building and vice versa.
e) Conveniently raising or lowering a paint can to a desired position while painting a house, or single story building.
f) Loading and unloading a wheel chair to motor vehicle.
g) Moving such objects around the house as sand, gravel, rock-salt, birdseed, dog-food, groceries and other heavy packages of all sorts.
h) Removing, transporting, storing and reinstalling a mini-van rear seat quickly and easily.

SUMMARY

This invention comprises methods, devices and system for easily loading, lifting, transporting, and unloading moderately heavy objects of 25 to 100 pounds approximately in all types of places inter alia in the office, home, workshop, garage, basement, drive way or the like places.

Plurality of embodiments with plurality of features and a plurality of load carrying members are disclosed to suit varying needs, loads and circumstances. Some embodiments are manual, some others utilize a mechanical advantage and still others are motorized. Load carrying member can be simple platform or a sturdy basket or even a simple bracket or hook for attaching a paint can or the like heavy object.

PRIOR ART

Prior art patents disclose the general concept of lifting objects. The problem with prior art lifting devices is that they are cumbersome, expensive and suitable for specialized purposes only.

A preliminary prior art search was conducted and furthermore the inventor is intimately familiar with the problem and the prior art. The following U.S. patents are typical examples of the prior art attempting to solve the problem.

a) U.S. Pat. No. 5,205,571 granted to Geier et al on Apr. 27, 1993 for "Easy Lift Aircraft Chair Cart"
b) U.S. Pat. No. 5,375,681 awarded to Karl Eickman on Dec. 27, 1994 for "Lifting Device and Stroke Multiplier"
c) U.S. Pat. No. 5,184,366 earned by Rawdon et al on Feb. 9, 1993 for "Aircraft Cargo Handling System"
d) U.S. Pat. No. 5,137,317 conferred upon Christopher Bieniek on Aug. 11, 1992 for "Shovel Lift Apparatus."

Unfortunately none of the prior art devices singly or even in combination meet all of the objectives established by the inventor for this system.

OBJECTIVES

1. It is an objective of this invention to provide simple, low cost, general purpose devices and system for easily loading, lifting, transporting, and unloading moderately heavy objects in the office, home, workshop, garage, basement, drive way or the like places.
2. Another objective of this invention is that it be suitable for multiple general purposes for plurality of uses by the "Do it Yourself" mover or user.
3. Another objective of this invention is that it be compact with small foot print.
4. Another objective of this invention is that it include a general purpose lift platform for sliding on, raising or lowering and sliding off a heavy object.
5. Another objective of this invention is that it be safe stable and reliable with a low center of gravity well within the base of the device.
6. Another objective of this invention is that it be ergonomically designed, user friendly, environmentally friendly and aesthetically integrated in a pleasing manner.
7. Another objective of this invention is that it can be used at home, office, yard, parking lot or even in transit with equal ease and facility.
8. Another objective of this system is that an embodiment of this invention include a basket as a load carrying member.
9. Another objective of this invention is that it provide versatility and variety for carrying different types of loads under different circumstances to varying distances.
10. Another objective of this invention is that an embodiment of this invention include a bracket or hook for carrying a paint can.
11. Another objective of this invention is that it can be made from a variety of materials.
12. Another objective of this invention is that it meet all federal, state, local and other private standards and regulations with respect to safety, environment, energy consumption, noise etc. etc.
13. Another objective of this invention is that it be energy efficient.
18. Another objective of this invention is that an embodiment of this invention employ mechanical advantage with crank, pulley, lever, screw, chain and sprocket or the like.

19. Another objective of this invention is that its various components be modular and aesthetically integrated with each other and the environment.
20. Another objective of this invention is that it be safe and easy to steer by incorporating a steering handle, casters, and brakes etc.
21. Another objective of this invention is that an embodiment of this invention provide an ultra low cost clamp means of raising the empty load member to a desired height and then lowering the loaded member with a simple clamp release to floor level for easy sliding off the load.
22. Another objective of this invention is to facilitate relocation of objects without any adverse impact on the clothes of the user.
23. Another objective of this invention is that it be compactable for easy storage.
24. Another objective of this invention is that it operate on a rechargeable battery, readily available alkaline cells or an extension cord from a 12 volt direct current automotive power socket.
25. Another objective of this invention is that its wheels for transport be suitable for surfaces and terrain of various types including, grass, wood floors, cement, asphalt, dirt etc.
26. Another objective of this invention is that its use not adversely impact the terrain it traverses.
27. Another objective of this invention is that its various components be so attached that they cannot be lost, misplaced or stolen.
28. Another objective of this invention is to pre-program a height levels matching tailgate of a van, the bed of a truck or the lip of trunk such that the platform can be automatically raised to the programmed level.
29. Another objective of this invention is that it cannot be damaged by incorporation of a slip clutch such that if and when the load limit is exceeded, the device will not operate and cannot be damaged.
30. Another objective of this invention is to interface a motor to the wheel base member for easy and assisted travel of the easy lift of this invention.
31. Another objective of this invention is to provide multiple load members.
32. Another objective of this invention is to provide a motorized wheel and track attachment for easy loading, transportation and unloading of a mini-van rear seat.
33. Another objective of this invention is to provide a second load member that can be quickly clipped on to the first load member for carrying such additional items as boxes, picnic baskets, ice chests,tool boxes and the like items.
34. Another objective of this invention is to provide multiple optional load member shelves for carrying paint cans, paint roller trays, a basket with fold down sides, a flat shelf for carrying lawn fertilizer or the like items.
35. Other objectives of this invention reside in its simplicity, elegance of design, ease of manufacture, service and use and even aesthetics as will become apparent from the following brief description of the drawing and detailed description of the concept.

BRIEF DESCRIPTION OF THE DRAWING

The objects, features and advantages of the present invention and its numerous applications will be more readily appreciated when read in conjunction with the accompanying drawing, in which:

a) FIG. 1(a) is a pictorial, isometric perspective view of a preferred embodiment of this invention incorporating a motor, a simple platform without a load and a foldable, three wheel base assembly.

b) FIG. 1(b) is a pictorial, isometric perspective view of a preferred embodiment of this invention incorporating a motor, a simple platform with a load and a foldable, three wheel base assembly.

c) FIG. 2(a) is a front elevation thereof without the load.

d) FIG. 2(b) is a side elevation thereof.

e) FIG. 2(c) is a top view thereof.

DETAILED DESCRIPTION OF THE PREFERRED EMBODIMENT

Figure 3:
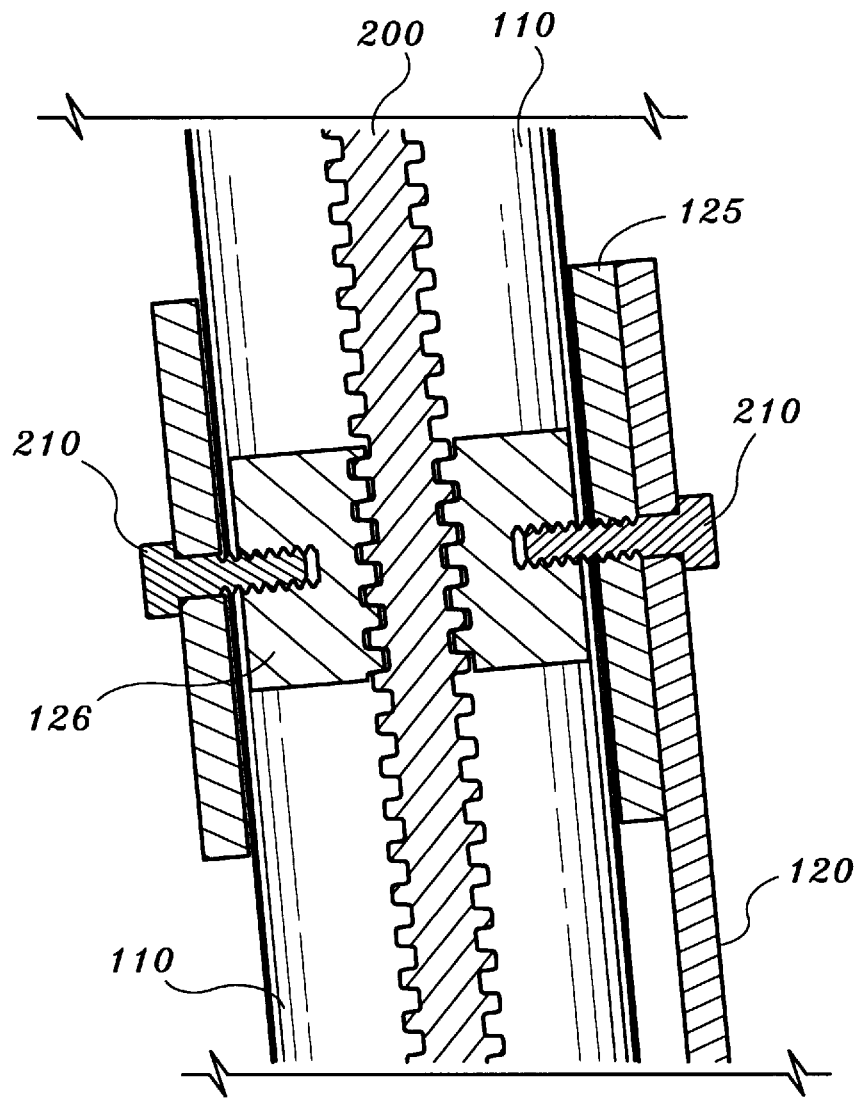
FIG. 3 is a cross sectional view along lines 3—3 of FIG. 2(c).

As shown in the drawings wherein like numerals represent like parts throughout the several views, there is generally disclosed in FIG. 1(a) a motorized embodiment of this invention without any load and in FIG. 1(b) with load 10 supported on a load member 120 in the form of an easy slide on slide off tray or platform member.

As can be seen in FIGS. 1 and 2 the motorized embodiment comprises a cylindrical base member 100, on which is supported an inverted U inclined vertical support member 110, through the center of which is employed a mechanical advantage screw 200 encased for safety & aesthetics in a cylindrical housing 140. A lift assembly 125 is connected to the screw 200.

A more detailed view of the lift assembly can be seen in FIG. 3 which is a view along lines 3—3 of FIG. 2(c) and is further explained later in this description. To the lift assembly is also attached a load carrying member 120 in the form of a platform or in the form of a basket 122 or in the form of a bracket or hook 124 for hanging a load 10 such as a paint can.

For easy and quick substitution of lift members such as platform (or tray) 120, a basket 122 or a bracket 124, there is included on the slide member 126 a pair of knobs 127 and a pair of keyhole slots 128 in the bracket 125 which is in turn connected to the load member platform 120 or other suitable load member such as a basket 122 or a hook 124.

Figure 4:
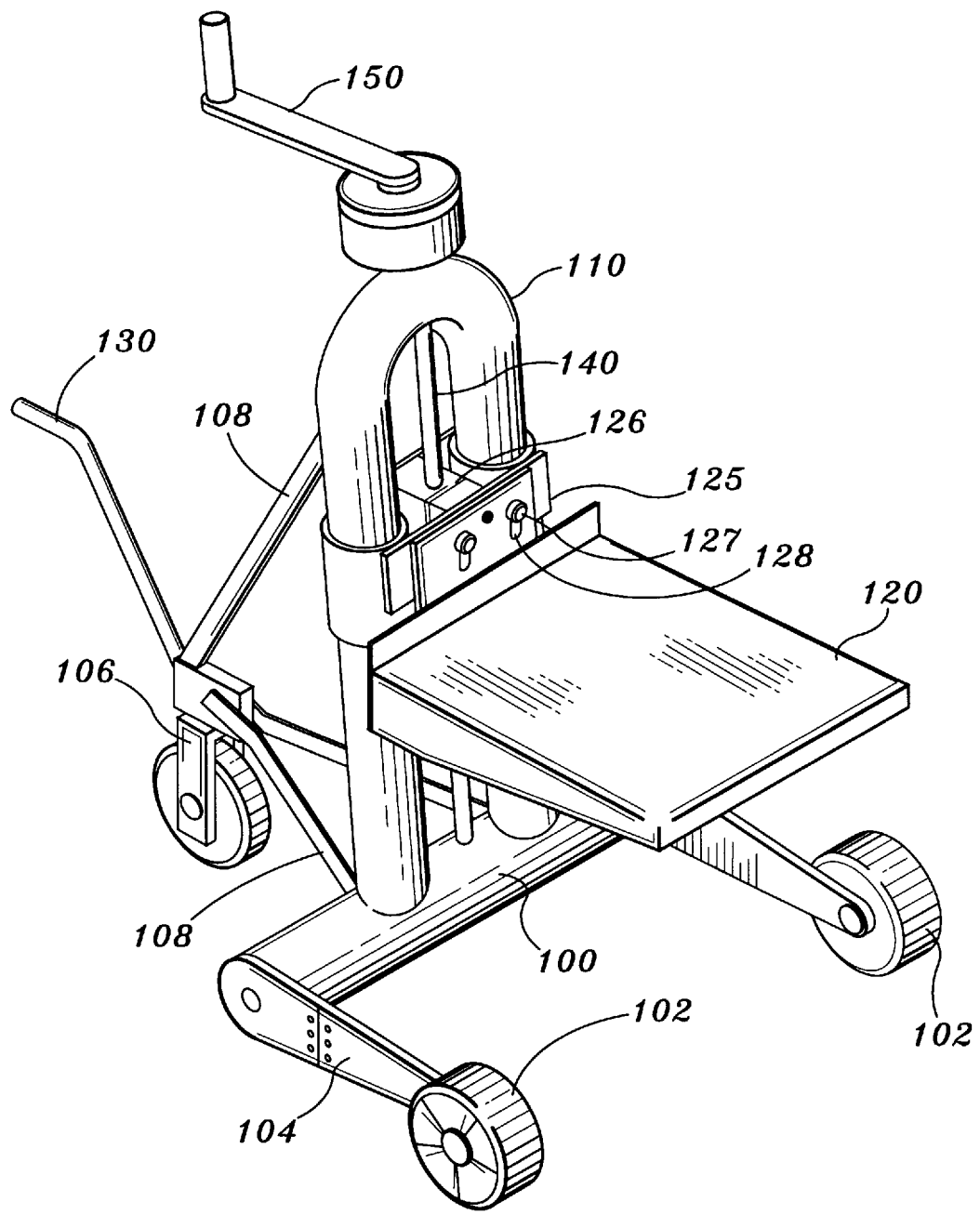
FIG. 4 is a pictorial, isometric perspective view of a manual embodiment of this invention incorporating a crank with a mechanical advantage screw, a simple platform without a load and a foldable, three wheel base assembly complete with a steering handle.

A motor 162 is housed in a housing 160 along with direct current battery 170. A double pole double throw switch 180 is also provided such that as the motor 162 turns the screw, the entire load platform is raised or lowered. DPDT switch also enables operation of the motor in the reverse direction. Alternatively the screw may be operated and hence the load member 120 raised or lowered by a hand crank 150 as is shown in FIG. 4.

A steering handle 130 is also provided for ease and safety of steering. The base 100 has also attached to it plurality of wheels 102, via collapsible and foldable members 104 as part of the base member 100.

Some of the wheels 102 may be in the form of casters for easy transportation of the Easy Lift of this invention. Plurality of brackets 108, 115 are used to support, secure and stabilize the easy lift of this invention as needed. Brackets 115 may be foldable or otherwise collapsible for easy and compact storage of the easy lift of this invention.

FIGS. 2(a), (b), and(c) respectively show front, side and top elevations of the motorized preferred embodiment. FIG. 3 which is a cross-sectional view along lines 3—3 of FIG. 2(c) also shows details of the screw 200 in housing 110 and its interface to lift assembly bracket 125 and lift block slider 126 via pivot screws 210.

FIG. 4 shows a pictorial, isometric perspective view of a manual embodiment of this invention incorporating a crank handle 150 with a mechanical advantage screw 200, in a protective housing 140, a simple platform 120 without a load and a three wheel base assembly 100 which comprises a pair of front wheels 102 connected via foldable member 104 and a caster tail wheel 106. A steering handle 130, a slip clutch and a brake is also provided.

Figure 5:
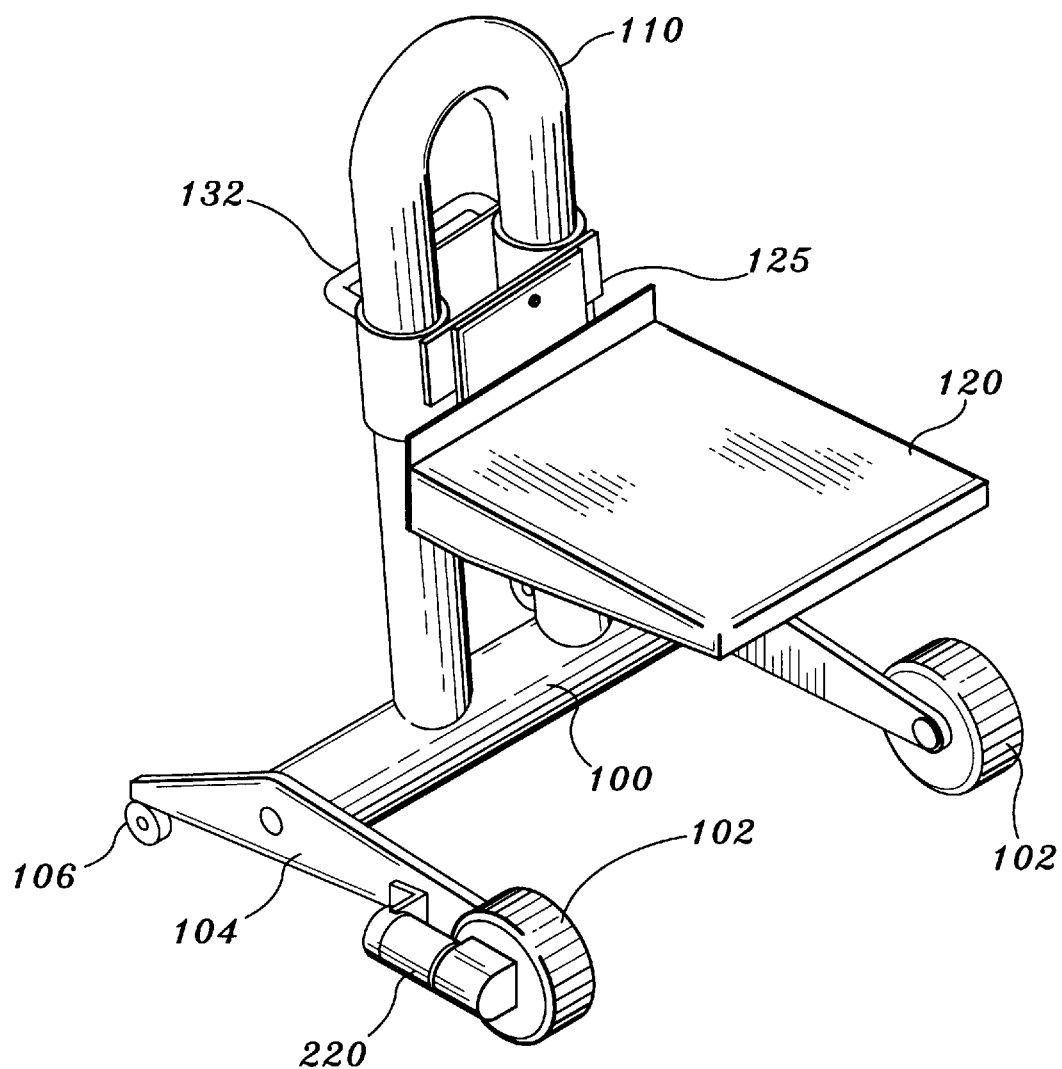
FIG. 5 is a pictorial, isometric perspective view of a manual alternate embodiment of this invention incorporating a simple clamp, a simple platform without a load and a four wheel base assembly, a motorized wheel and complete with a steering handle.

FIG. 5 shows a pictorial, isometric perspective view of a manual alternate embodiment of this invention incorporating an alternate handle 132, a simple platform 120 without a load and a four wheel base assembly 100.

The four wheel base assembly further includes a pair of front wheels 102 and a pair of rear wheel casters 106 connected to said base via member 104 complete with an alternate embodiment of the steering handle 132. One of the front wheels is motorized 220 for easy travel of the easy lift of this invention.

Figure 6:
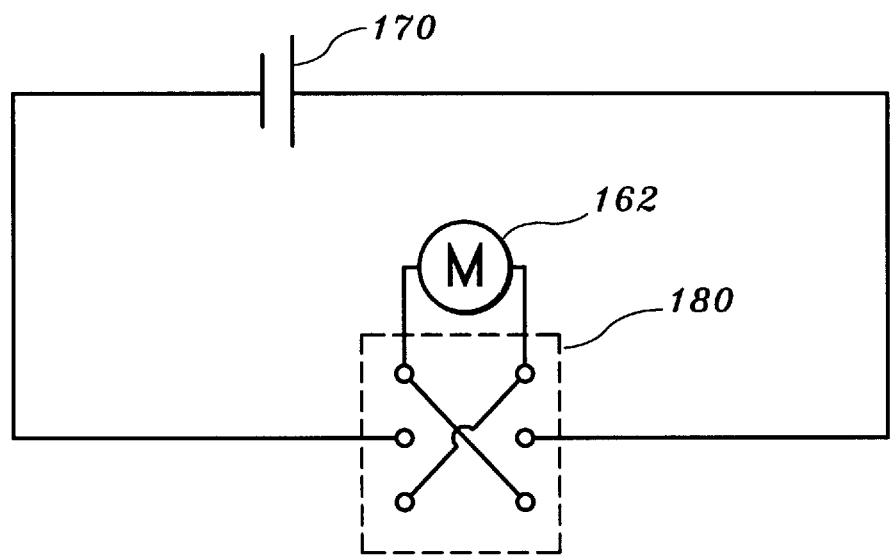
FIG. 6 is a schematic diagram showing the serial relationship between the motor, battery, switch and brake release of the motorized preferred embodiment.

FIG. 6 shows a schematic diagram showing the serial relationship between the direct current tenth horse power motor 162, a 12 volt rechargeable battery 170 and a double pole double throw switch 180 of the motorized preferred embodiment.

Figure 7:
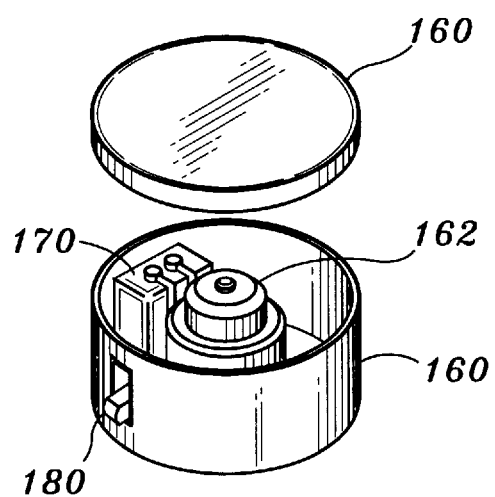
FIG. 7 is an exploded view of the motor housing showing the physical interface between the motor and the direct current battery.

FIG. 7 is an exploded view of the motor housing 160 showing the physical interface between the motor 162 and the direct current battery 170 and the switch 180.

Figure 8:
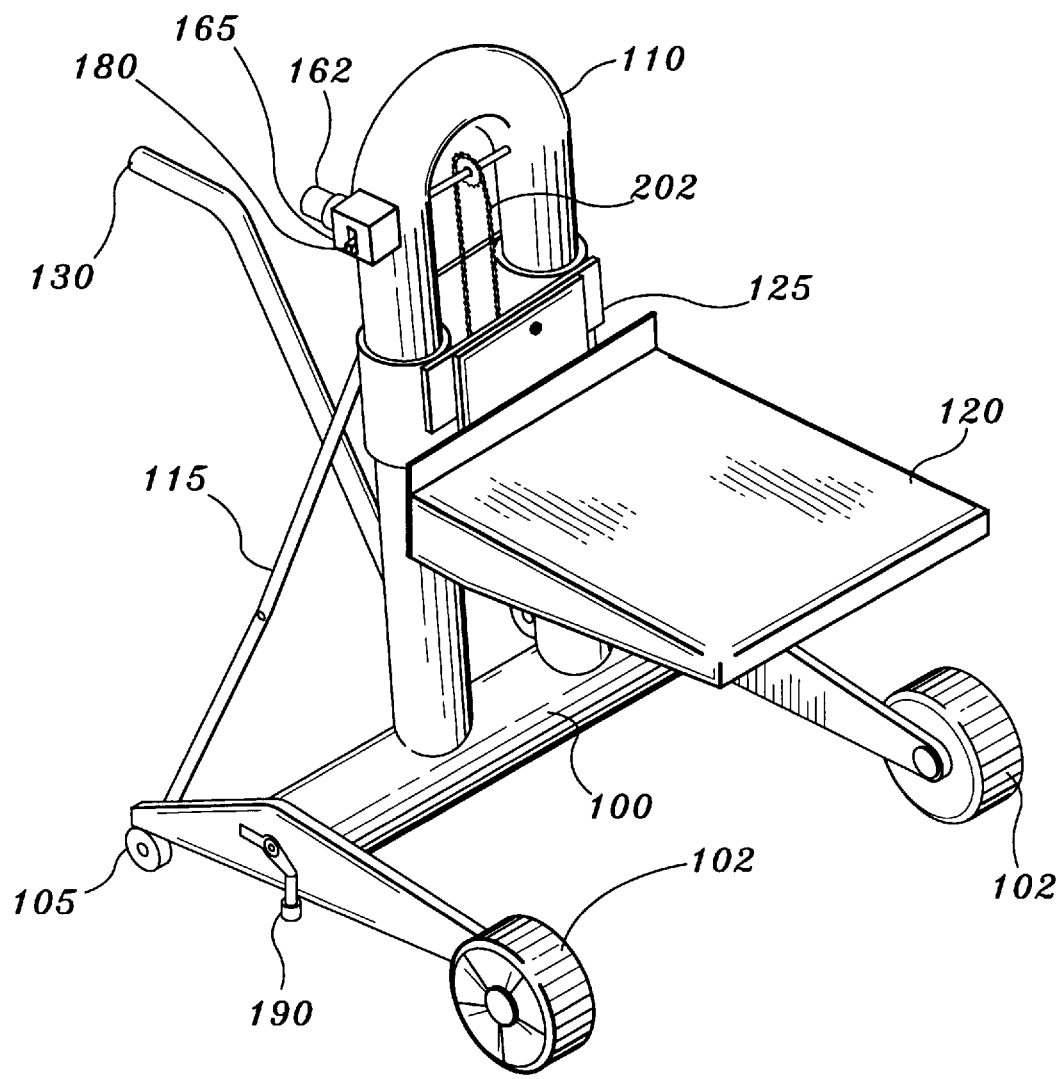
FIG. 8 is a pictorial, isometric perspective view of an alternate embodiment of this invention incorporating a drive chain as mechanical advantage, a motor, a basket as a load member without any load, and a four wheel base assembly.

FIG. 8 is a pictorial, isometric perspective view of an alternate embodiment of this invention incorporating a drive chain 202 as mechanical advantage, a motor 162 and its interface to worm drive with slip clutch 165, a load member 120 without any load, and a four wheel base assembly similar to that shown in FIG. 5.

FIG. 9(a) is a pictorial, isometric perspective view of yet another alternate embodiment of this invention incorporating a vertical support column 111 having a mechanical advantage screw member 200, a motor 162 , a simple platform 120 without a load and a three fixed wheel base assembly.

The foldable base assembly 100 also has a pair of front wheels 103 attached to the collapsible, foldable member 101 and a rear tail wheel 107. A steering handle 135 is integrated with the clamp for temporarily locking the load member 120 in desired position. For ease of transportation one of the wheels may be motorized. Similarly FIG. 9(b) is a pictorial, isometric perspective view of the alternate embodiment of FIG. 9(a) of this invention incorporating a screw 200 as a mechanical advantage member housed in a vertical support member column 111, a motor 162, a simple platform 120 with a load 10 and a three wheel base assembly as described.

Figure 9:
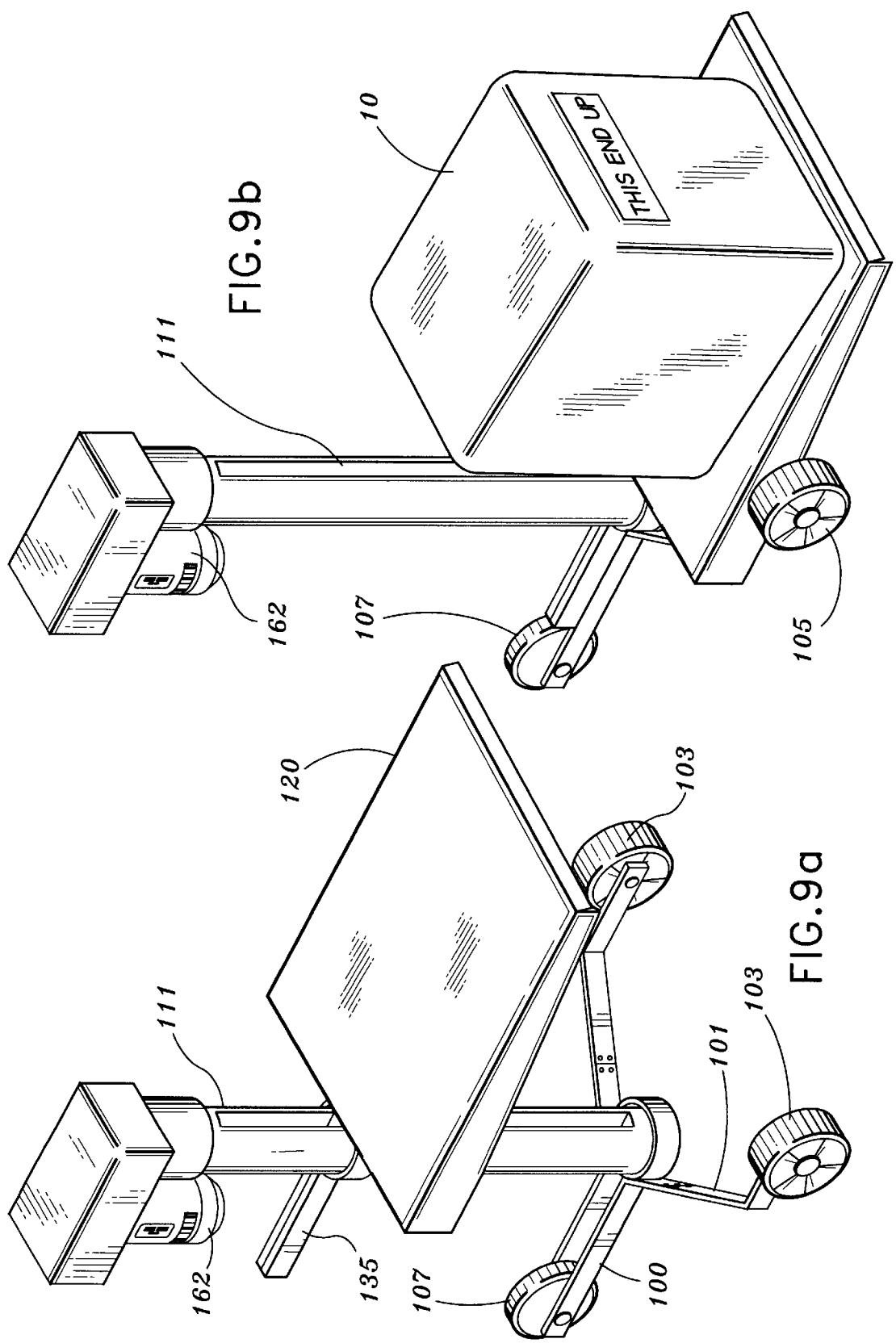
FIG. 9(a) is a pictorial, isometric perspective view of yet another alternate embodiment of this invention incorporating mechanical advantage member screw inside vertical member, a motor, a simple platform without a load and a foldable, three wheel base assembly.
FIG. 9(b) is a pictorial, isometric perspective view of the alternate embodiment of FIG. 9(a) of this invention incorporating mechanical advantage member screw inside a vertical support column, a motor, a simple platform with a load and a three wheel base assembly.
Figure 10:
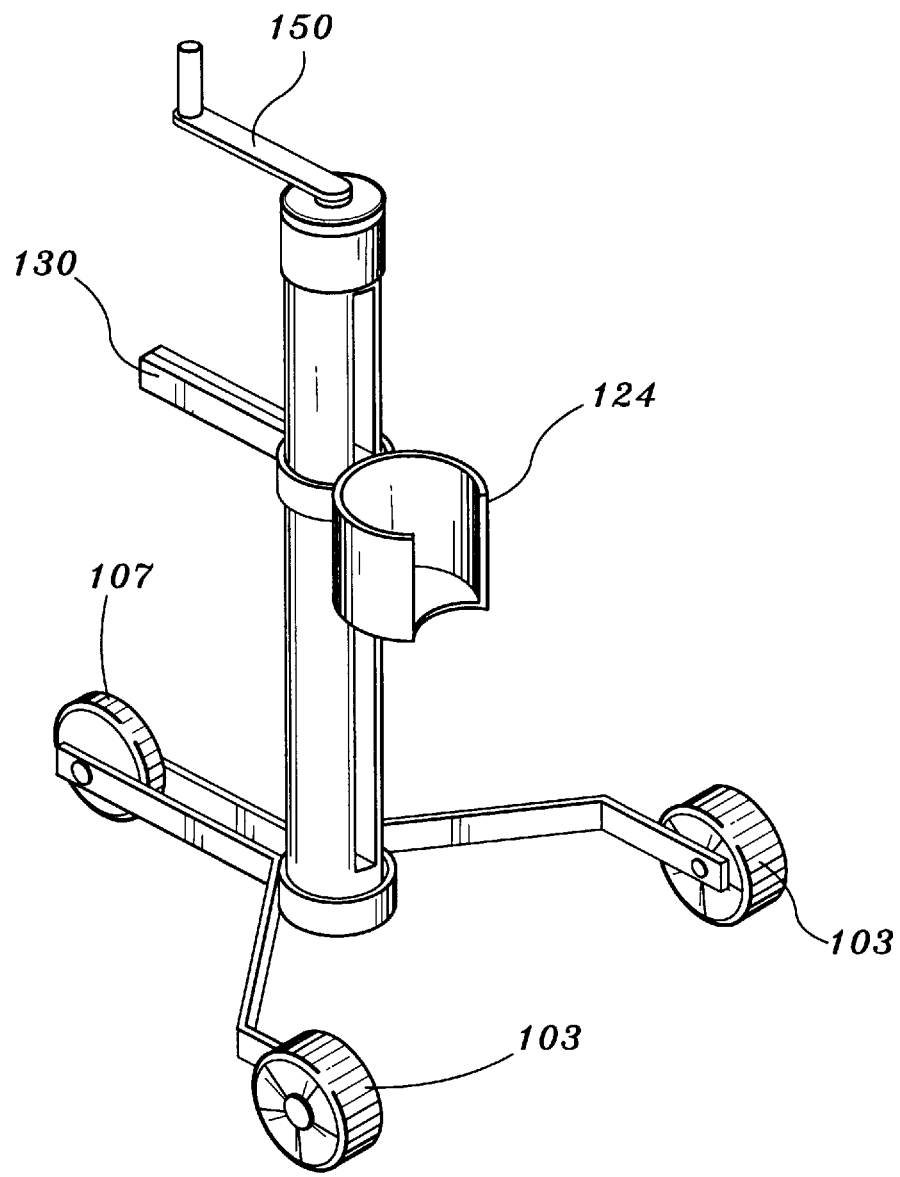
FIG. 10 is a pictorial, isometric perspective view of the alternate embodiment of FIG. 9 of this invention incorporating a crank with a mechanical advantage screw, a simple bracket without a load and a three wheel base assembly complete with a steering handle.

FIG. 10 is a pictorial, isometric perspective view of the alternate embodiment of FIG. 9 of this invention incorporating a crank 150 with a mechanical advantage screw 200 encased in vertical support member 111 of alternate design, a simple bracket 124 for anchoring a load such as a paint can (not shown) and a three wheel base assembly complete with a steering handle 130.

Figure 11:
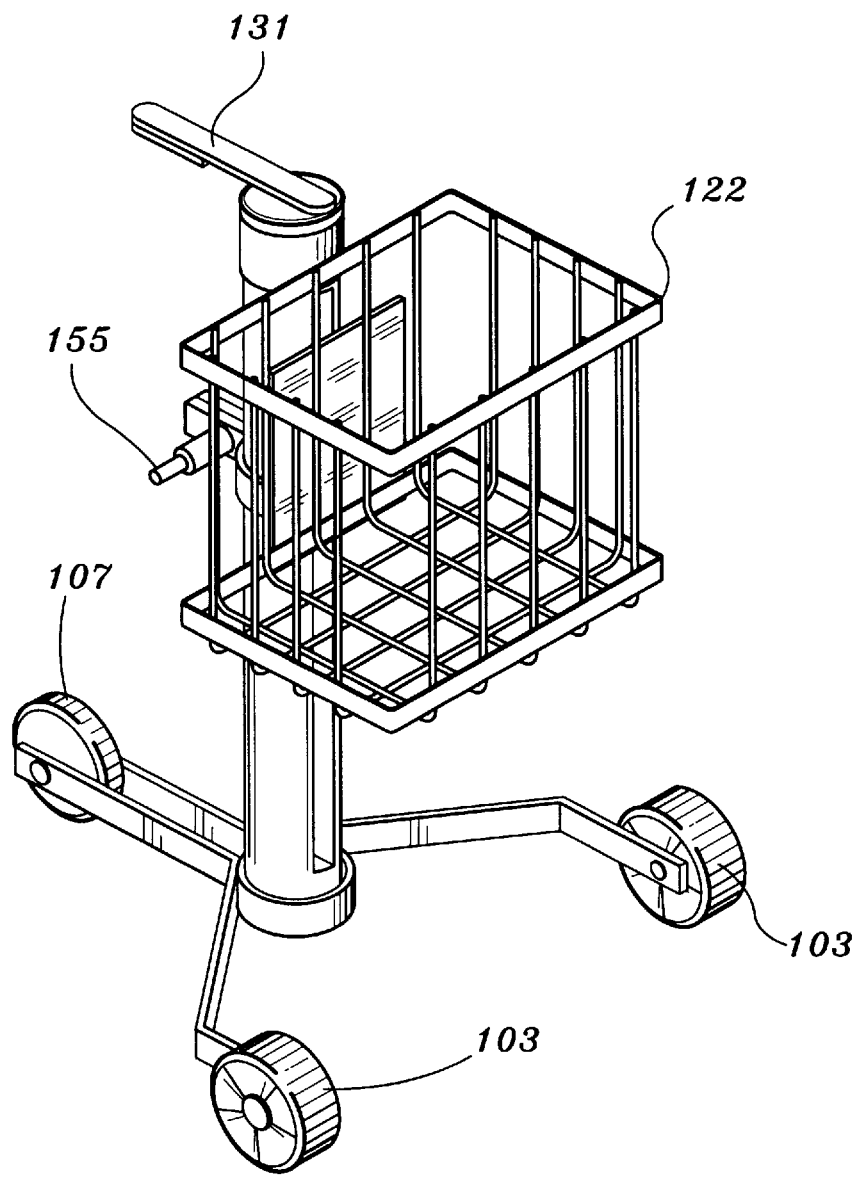
FIG. 11 is a pictorial, isometric perspective view of a yet another manual alternate embodiment of this invention incorporating a simple clamp, load release, a basket as a load member, a simple platform without any load and a three wheel base assembly complete with a steering handle.

FIG. 11 is a pictorial, isometric perspective view of a yet another manual alternate embodiment of this invention incorporating a simple clamp handle 131, a load release 155, a basket 122 as a load member without any load and a three wheel base assembly.

Figure 12:
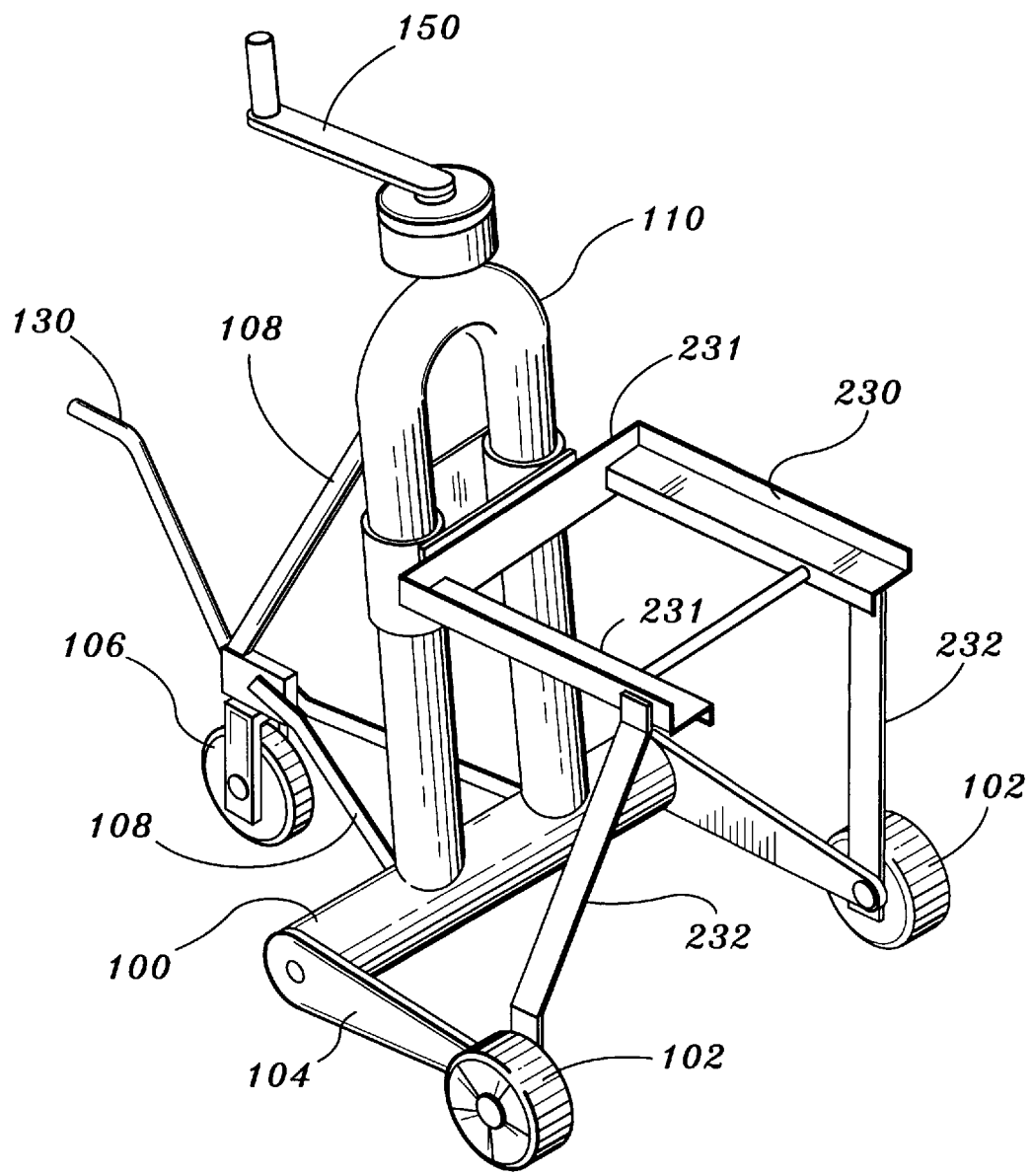
FIG. 12 is a an isometric pictorial perspective view of a three wheel embodiment with manual crank and a load member particularly adapted for loading, unloading and transporting of a mini-van rear seat.

FIG. 12 is a an isometric pictorial perspective view of a three wheel embodiment with manual crank 150 and a special load member 230 particularly adapted for loading, unloading and transporting of a mini-van rear seat.

The special load member 230 is anchored to the vertical support member 110 via brackets 231 and to the wheel base 100 via brackets 232.

OPERATION

The use and the operation of this invention is intuitive. Following summary of operation should be used as guideline.

1. A suitable load member is attached to the easy lift of this invention which is wheeled to the truck, car, van or other designated area.
2(a) For the motorized embodiment, the switch is depressed which enables the user to raise or lower the tray to the required height for loading. Certain commonly used heights may be pre-stored. User applies the wheel brake so that this particular embodiment of the invention does not accidentally move.
2(b) For the mechanical hand cranked embodiment the handle is cranked clockwise or counter clockwise to raise or lower the load member for easy slide on or slide off of the object. The operator applies the brake to prevent accidental movement of this particular embodiment of the invention.

2(c) For the mechanical clamp embodiment, the user slides the load member in the form of a shelf or tray to the desired height and tightens the clamp for stabilization during loading and/or unloading operation.

3. The operator slides the object on or off the load member platform.

It should be noted that a slip clutch is provided such that if the load limit of the invention is exceeded, the unit does not operate and is therefor cannot be damaged.

4. The operator releases the brake.

5. This particular embodiment of the invention is then wheeled to the desired position for unloading and another loading operation if necessary.

6. The device is folded and collapsed to a compact state and tucked away for storage until next use.

The inventor has given a non-limiting description of the concept. Many changes may be made to this design without deviating from the spirit of the concept of this invention. Examples of such contemplated variations include the following.

a) The invention may be combined or integrated with other complementary or related uses.

b) The shape of the invention may be modified.

c) A different mechanical advantage may be employed.

d) A different load member may be employed.

e) Lift parameters may be modified.

g) A DIY (Do It Yourself) kit may be derived from this invention.

i) Some of the discrete component functions may be realized by software by including a microprocessor.

j) A high power high load version may be employed.

k) The incline of the vertical support member be somewhat increased or decreased.

l) CW/CCW convention may be reversed.

m) Fewer or additional members of the device may be made foldable and collapsible.

n) Instead of a physical mechanical memory for storing certain commonly used heights a computer volatile or nonvolatile memory be used.

o) Some of the functions may be realized by a microprocessor which may or may not be programmable.

p) The wheel base assembly may be motorized for assisted travel of this invention.

q) Braces may be made foldable or otherwise collapsible for easy and compact storage of the easy lift of this invention.

r) Multiple load members of various shapes and sizes may be added.

Other changes such as aesthetic and substitution of newer materials as they become available which substantially perform the same function in substantially the same way with substantially the same result without deviating from the spirit of this invention may be made.

DEFINITIONS

A great care has been taken to use words with their conventional dictionary definitions. Following definitions are included here for clarification.

CW/CCW=Clock-wise/Counter Clock-Wise

D.C.=Direct Current

DIY=Do It Yourself

DPDT=Double Pole Double Throw Switch

Integrated=Combining of two or more entities to act like one.

Interface=Relation ship between two dissimilar entities.

Following is a listing of the components used in this embodiment arranged in ascending order of the reference numerals for ready reference of the reader.

10=Load
100=Horizontal Cylindrical Base Member
101=collapsible, foldable member
102=A pair of pivotable, retractable front wheels connected to horizontal base member 100.
103=Alternate pair of fixed front wheels
104=A horizontal extension member connected to horizontal cylindrical base member 100 and front wheels
105=A pair of rear wheel casters
106=A caster rear tail wheel
107=a fixed rear tail wheel for an alternate embodiment
108=Tail wheel support bracket
110=Inclined Vertical Support member
111=Alternate embodiment of vertical support member
115=Supporting braces for the vertical support member which may be foldable or collapsible.
120=Load member in the form of a simple platform
122=Alternate load member in the form of a basket.
124=Alternate load member in the form a bracket for hanging a load such as a paint can.
125=Lift Assembly Bracket
126=Lift block Slider
127=A pair of knobs on slider 126
128=A pair of keyhole slots on bracket 125
130=A steering handle
131=Clamp and handle
132=Alternate steering handle
134=Stationary handle
135=Integrated latch and steering handle
140=A mechanical advantage member housing
150=A crank
155=A load release
160=A motor housing containing a gear head tenth horse power direct current motor and a d.c. battery.
162=A direct current gear head motor
165=A worm drive with slip clutch
170=A rechargeable direct current power source such as a battery.
180=A switch such as DPDT Double Pole Double Throw to enable motor in reverse direction
190=Brake
200=Mechanical advantage screw
202=Mechanical advantage drive chain
210=Pivot screws
220=Motor for wheel
230=Special load member adapted for transporting a mini-van car seat.
231=Support bracket between vertical support member and special Load Member.
232=Support bracket between special load member and wheel base.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to this description. It is therefore contemplated that the appended claims cover any such modifications, and/or embodiments that fall within the true scope of the invention.

The Inventor claims:

1. A portable lifting system for movement of moderately heavy items comprising:

a foldable base member;

a vertical support member connected to said base member;

a plurality of load members including a platform, hook and basket, wherein each of said plurality of load members is connectable along said vertical support members means for releasably connecting each of said plurality of load members to said vertical support member, wherein said means for releasably connecting allows for at least one of said plurality of load members to be interchangeable with at least one other of said plurality of load members.

2. The portable lifting system of claim 1 which includes a mechanical advantage member connected to said at least one of said plurality of load members.

3. The portable lifting system of claim 2 wherein said mechanical advantage member is a screw.

4. The portable lifting system of claim 2 wherein said mechanical advantage member is driven by a direct current motor which in turn is powered by a direct current battery.

5. The portable lifting system of claim 2 wherein said base member includes a plurality of pivotable and collapsible wheels and casters;

a steering handle connected to said base member; and a brake releaseably connected to said base member.

6. The lifting system of claim 5 wherein at least one of said plurality of wheels is motorized.

7. The lifting system of claim 2 wherein said mechanical advantage member is a worm gear drive with a slip clutch.

8. The lifting system of claim 2 wherein said mechanical advantage member is a drive chain.

9. The lifting system of claim 2 wherein said mechanical advantage member is driven by a manual hand crank connected to said mechanical advantage member.

* * * * *